US006618178B2

(12) United States Patent
Engelhardt

(10) Patent No.: US 6,618,178 B2
(45) Date of Patent: Sep. 9, 2003

(54) OPTICAL ARRANGEMENT FOR DEFLECTING A LIGHT BEAM, PARTICULARLY IN TWO SUBSTANTIALLY MUTUALLY PERPENDICULAR DIRECTIONS AND CONFOCAL SCANNING MICROSCOPE

(75) Inventor: Johann Engelhardt, Bad Schoenborn (DE)

(73) Assignee: Leica Microsystems Heidelberg, Mannheim (DE)

( * ) Notice: Subject to any disclaimer, the term of this patent is extended or adjusted under 35 U.S.C. 154(b) by 0 days.

(21) Appl. No.: 09/901,274

(22) Filed: Jul. 9, 2001

(65) Prior Publication Data
US 2002/0008904 A1 Jan. 24, 2002

(30) Foreign Application Priority Data
Jul. 11, 2000 (DE) .......................... 100 33 549

(51) Int. Cl.[7] .............................................. G02B 26/08
(52) U.S. Cl. ...................... 359/201; 359/214; 359/368
(58) Field of Search ................. 359/201, 202, 359/196, 197, 212, 213, 214, 368, 385

(56) References Cited

U.S. PATENT DOCUMENTS 3,718,761 A * 2/1973 Myer .................. 235/462.39
4,264,152 A * 4/1981 Crane ..................... 351/210
4,798,451 A * 1/1989 Fujiwara ................. 359/375

FOREIGN PATENT DOCUMENTS

DE 196 54 210 C2 6/1998

* cited by examiner

Primary Examiner—Mark A. Robinson
(74) Attorney, Agent, or Firm—Simpson & Simpson, PLLC

(57) ABSTRACT

The present invention relates to an optical arrangement for deflecting a light beam (1, 14), in particular in two substantially mutually perpendicular directions (2, 3), preferably for applying to confocal scanning microscopes, having two mirrors (8, 10) which can be rotated by means of a rotary drive (4, 5) in each case about mutually perpendicular axes—the x-axis (6) and y-axis (7)—one of the two mirrors (8, 10) being assigned a further mirror (9) in a prescribed angular position in a rotationally fixed fashion such that the mutually assigned mirrors (8, 9)—first and second mirrors—rotate jointly about the y-axis (7), and in so doing rotate the light beam (1, 14) about a pivot (11) which lies on the axis of rotation (6)—the x-axis—of the third mirror (10). In order to minimize and, in the ideal case, to eliminate the distortion errors produced by the arrangement, the optical arrangement is characterized in that the mirrors (8, 9, 10) are arranged in such a way that the optical axis of the light beam (12) running between the second and the third mirrors (9, 10) always lies substantially in a plane containing the x-axis (6) and perpendicular to the y-axis (7).

38 Claims, 3 Drawing Sheets

OPTICAL ARRANGEMENT FOR DEFLECTING A LIGHT BEAM, PARTICULARLY IN TWO SUBSTANTIALLY MUTUALLY PERPENDICULAR DIRECTIONS AND CONFOCAL SCANNING MICROSCOPE

CROSS REFERENCE TO RELATED APPLICATIONS

This invention claims priority of the German patent application DE 100 33 549.7 filed Jul. 11, 2000 which is incorporated by reference herein.

FIELD OF THE INVENTION

The present invention relates to an optical arrangement for deflecting a light beam in particular in two substantially mutually perpendicular directions, preferably for applying to confocal scanning microscopes.

BACKGROUND OF THE INVENTION

An optical arrangement of the generically determinative type is disclosed in DE 196 54 210 C2. The arrangement known from this printed publication for scanning a beam advantageously permits high scanning rates during deflection of the light beam.

Disadvantageous in the known arrangement are scanning errors which arise in the form of a hyperbolic distortion, particularly after the scanning of an object with a confocal scanning microscope. The distortion can certainly be corrected computationally, but is problematical under some circumstances since the image cannot be uniquely reconstructed computationally, particularly in the case of object scanning in which the scanning theorem is not fulfilled.

SUMMARY OF THE INVENTION

The object of the present invention is therefore to specify and develop a generically determinative arrangement for deflecting a light beam in two substantially mutually perpendicular directions in such a way that the distortion errors generated by the arrangement can be minimized and, in the ideal case, eliminated.

The above object is accomplished by the arrangement according to the invention which comprises: a first rotary drive defining a first axis of rotation, a second rotary drive defining a second axis of rotation, wherein the axes are mutually perpendicular, a first mirror rotated by the first rotary device, a second mirror rotated by the second rotary device, a third mirror arranged in an angular position with respect to the first mirror wherein the first and third mirror rotate jointly about the first axis, a pivot point is defined on the second mirror, wherein the light beam pivots about the pivot which lies on the second of rotation of the second mirror, and the first, second and third mirrors are arranged, that a light beam running between the second and the third mirrors and the second axis of rotation are always substantially in one plane and the plane is perpendicular to the first axis of rotation.

It is a further object of the present invention to specify a confocal scanning microscope which has an optical arrangement for deflecting a light beam in two substantially mutually perpendicular directions and eliminates distortion errors generated by the optical arrangement.

The above object is accomplished by a confocal scanning microscope comprising: an optical arrangement for deflecting a light beam in two substantially mutually perpendicular directions, the optical arrangement has a first rotary drive defining a first axis of rotation, a second rotary drive defining a second axis of rotation, wherein the axes are mutually perpendicular, a first mirror rotated by the first rotary device, a second mirror rotated by the second rotary device, a third mirror arranged in an angular position with respect to the first mirror wherein the first and third mirror rotate jointly about the first axis, a pivot point is defined on the second mirror, wherein the light beam pivots about the pivot which lies on the second axis of rotation of the second mirror, and the first second and third mirrors are arranged, that a light beam running the second and the third mirrors and the second axis of rotation are always substantially in one plane and the plane is perpendicular to the first axis or rotation.

An additional object of the invention is to provide a confocal scanning microscope which has a simple designed optical arrangement for deflecting a light beam in two substantially mutually perpendicular directions and thereby eliminating distortion errors generated by the optical arrangement.

The above object is accomplished by a confocal scanning microscope comprising: an optical arrangement for deflecting a light beam in two substantially mutually perpendicular directions, wherein the optical arrangement has a housing which accommodates a first, third and fourth mirror and a holding device which accommodates a second mirror and the holding device rotatable mounts the housing wherein the holding device and the housing are configured as replaceable modules.

According to the invention, it has been initially realized that the hyperbolic distortion named in DE 196 54 210 C2 can be minimized or eliminated whenever the rotation of the mutually assigned mirrors—first and third mirrors—, which rotate jointly about the first axis of rotation, deflect the light beam after reflection at the third mirror only along one direction or one straight line. Likewise, during rotation of the second mirror about the second axis of rotation the light beam need be deflected only along one direction or one straight line. Consequently, the decoupling of the rotation of the mirrors about their respective axes of rotation relative to the direction of deflection corresponding to the directions of deflection of the respective other axis of rotation is a fundamental precondition for deflecting the light beam with little distortion. The arrangement according to the invention of the first and third mirrors relative to the second mirror permits such a decoupling, since the optical axis of the light beam reflected by the third mirror and running to the second mirror always impinges on the second mirror, and the point of impingement of the optical axis of the light beam lies on the second axis of rotation of the second mirror and always lies in the plane perpendicular to the first axis of rotation in the way according to the invention during rotation of the two mirrors assigned to one another.

In a further advantageous way, the mirrors are arranged in such a way that the optical axis of the light beam running from the third mirror to the second mirror always impinges substantially at a point on the mirror surface of the second mirror which is the point of intersection of the two axes of rotation. Owing to this arrangement of the mirrors, when the first and third mirrors are rotated independently of the pivot angle thereof, the optical axis of the light beam reflected by the second mirror is always pivoted about the same point, and this advantageously maintains a telecentric beam path even downstream of the mirror arrangement. Since the point of impingement of the light beam reflected by the third mirror on the second mirror is always substantially the same independently of the angular position of the second mirror, with reference to the direction of deflection of the third mirror, as well, the light beam reflected or deflected by the third mirror is always pivoted about the point which lies on the mirror surface of the second mirror and is the point of intersection of the two axes of rotation. Consequently, the light beam deflected by the mirrors is deflected, in particular, in two substantially mutually perpendicular directions.

It is of no consequence for the mode of operation of the arrangement for deflecting a light beam whether the light beam to be deflected is a non-expanded or an expanded, or collimated, light beam.

In a concrete embodiment, the optical axis of the light beam incident on the first mirror, and the optical axis of the light beam reflected by the second mirror are substantially collinear. This holds, however, only when the second mirror is located in the non-deflected position, that is to say the second rotary drive rotating the second mirror is located in its rest position. The collinear arrangement of the optical axes is advantageous, in particular, for the adjustment and/or mounting of the arrangement since, without the three mirrors of the deflecting arrangement, the incident light beam points at the same point which results when the three mirrors of the deflecting arrangement are into the optical beam path. In a further embodiment, the axis of rotation of the first and third mirrors is substantially collinear with the optical axis of the light beam incident on the first mirror. The result is that, when the first and third mirrors rotate about the first axis or rotation, the point of impingement of the optical axis of the incident beam on the first mirror is always the same independently of the angular position of the first and third mirrors. However, the precondition for this is that the first mirror is arranged in such a way that the axis of rotation of the first and third mirrors and the mirror surface of the first mirror have a point of intersection.

In a further embodiment, the axis of rotation of the first and third mirrors is substantially collinear with the optical axis of the light beam reflected by the second mirror. This holds, likewise, only when the second mirror is not in the deflected position.

In a concrete embodiment, it is provided that the first rotary drive rotating the first and third mirrors about first axis of rotation is arranged spatially between the first and the second mirrors. As a result, it may also advantageously be possible for collinearity to exist between the optical axis of the light beam incident on the first mirror and the optical axis of the light beam reflected by the second mirror. The optical arrangement for deflecting the light beam could, without further deflection, deflect or pivot a light beam running in one direction, the pivot of the deflected light beam lying on the optical axis of the originally running light beam. The deflection which can thus be achieved would continue to have a central axis coinciding with the direction of the originally running light beam, as it were a "straight-ahead" deflection or lateral spreading.

In an alternative embodiment, a fourth mirror is arranged between the first rotary drive rotating the first and third mirrors about the first axis of rotation and the first mirror. This mirror permits a deflection of the light beam by a virtually arbitrary angle such that the light beam deflected or spread laterally by the optical arrangement has a central axis which does not coincide with the original direction of propagation of the light beam upstream of the reflection at the fourth mirror.

The fourth mirror is arranged fixed in this case. If appropriate, it can be moved for the purpose of adjustment and/or during production, but it is locked in its position after the adjustment.

The first and third mirrors are arranged in a housing. The housing has at least two openings through which the light beams can enter and emerge. The housing has corresponding holding means on which it is possible for the two mirrors to be glued or fastened in another way. The housing is preferably made from light material and, after being produced by shaping—for example by chip-forming shaping—ideally has an adequate precision such that, after introduction of the two mirrors, there is no need for any further adjustment of the mirrors relative to the housing. Production which is reproducible and quick is advantageously rendered possible thereby. The light incident on the first mirror enters the housing through one opening. The light reflected by the third mirror emerges from the housing through the other opening. No further openings are provided in the housing, in order to avoid pollution by dust particles. The housing could, however, have a removable side wall which can be opened for cleaning purposes even after a lengthy operating period.

The housing is directly connected to the first rotary drive, preferably directly to the first axis of rotation of the latter. An indirect connection of the housing to the rotary drive would be conceivable as an alternative to this, for example via a gear, cardan joint or an uncoiling leaf element. A transmission ratio could thereby reduce or increase the possible angle of rotation of the rotary drive if the mirrors need to be rotated over a smaller or larger angular range. Again, the maximum or minimum rate of rotation or pivoting could be raised or lowered thereby. An uncoiling leaf element—such as is normally used with magnetic heads of computer hard disks—could rotate the housing about an axis which need not be collinear with the axis of rotation of the rotary drive.

In the same way, the second mirror could be connected either directly or indirectly to a second rotary drive. In the former case, the second mirror is preferably connected directly to the second axis of rotation of the second rotary drive in the latter case, the second mirror could be connected to the second rotary drive via a gear, cardan joint or an uncoiling leaf element.

The two rotary drives can be fitted either indirectly or directly on a holding device. The holding device could, for example, be a plate on which the two rotary drives are fastened. It is thereby ensured that the two rotary drives are arranged in a well-defined position relative to one another. Moreover, the holding device could be designed as an angled plate, a double-angled plate or a housing with appropriate holes.

The holding device is advantageously arranged rotatably. In a preferred embodiment, the holding device rotates about the first axis of rotation. Owing to the rotation of the holding device, the two rotary drives of the three mirrors are rotated jointly about the axis of the holding device such that the orientation of the beam deflecting directions is variable. This is advantageous, in particular, because the orientation of the direction of deflection of the second mirror rotating on its own. The second mirror rotating on its own is generally operated at a considerably higher scanning rate than the housing accommodating the first and third mirrors, which has a very much greater mass. Consequently, the fast direction of beam deflection of the second mirror rotating on its own can be orientated at will by rotating the holding device, and this is of great advantage, in particular, for applications in confocal scanning microscopy.

The housing accommodating the two first mirrors has a rotary bearing. This rotary bearing could be mounted in the holding device. If no common holding device is provided for the two rotary drives, the rotary bearing could be mounted directly in the housing accommodating the arrangement for deflecting a light beam. In a concrete embodiment, the axis of the rotary bearing is collinear with the axis of rotation of the first and third mirrors.

It is provided, furthermore, that the holding device has at least one rotary bearing which permits the holding device to be rotated about an axis. The rotary bearing of the housing of the first and third mirrors could now be mounted in a rotary bearing of the holding device. In this case, the axis of the rotary bearing of the housing of the first and third mirrors could be arranged collinearly with the axis of the rotary bearing of the holding device.

With regard to a flexible use of the optical arrangement according to the invention for deflecting a light beam, it is provided that the individual components are of modular design and are easy to replace. For this purpose, it would be possible, for example, to combine the housing accommodating the first and third mirrors and the rotary drive rotating in the housing to form a replaceable module. Furthermore, the second mirror and the rotary drive rotating it could be combined to form a replaceable module. One option thereby would be to replace the housing with the first and third mirrors together with the rotary drive thereof in order, for example, to vary the angular range of the deflection about the first axis of rotation. The second mirror and the rotary drive rotating it could also be replaced as a module in order, for example, to insert a rotary drive of higher or lower scanning rate into the optical arrangement. A flexible expansion of the field of application of the arrangement according to the invention is advantageously possible thereby. Furthermore, the overall holding device could be designed in the form of a replaceable module such that the complete arrangement according to the invention for deflecting a light beam is replaceable.

In order to avoid complicated and/or lengthy adjustments, it is provided that the replaceable modules and/or the holding device of modular design have means for exact positioning. These means could be designed, for example, in the form of guide elements and/or stop elements.

A galvanometer could be used as rotary drive for the housing accommodating the first and third mirrors, or for the second mirror. A resonant galvanometer could also be used to achieve a high scanning and/or deflecting rate. A resonant galvanometer is preferably used as rotary drive for the second mirror rotating on its own. It would also be possible to use a stepping motor as rotary drive.

One of the mirrors could be replaced by an active optical component for the purpose likewise of achieving a high scanning or deflecting rate. Use could be made for purpose of, for example, an AOD (Acousto-Optical Deflector), EOD (Electro-Optical Deflector) or a DMD (Digital Micro-Mirror Device). It would be conceivable in this case to replace the second mirror rotating on its own by an active optical component. This optical component could be fitted in the holding device.

Furthermore, at least one optically active component could be arranged upstream and/or downstream of the optical arrangement for deflecting a light beam, that is to say the three mirrors. The optically active component in this case could be an AOD, EOD or DMD, as well.

BRIEF DESCRIPTION OF THE DRAWINGS

There are various possibilities for configuring and developing the teaching of the present invention in an advantageous way. In conjunction with the explanation of the preferred exemplary embodiments of the invention with the aid of the drawing generally preferred configurations and developments of the teaching are also explained. In the drawing.

DETAILED DESCRIPTION OF THE INVENTION

Figure 1:
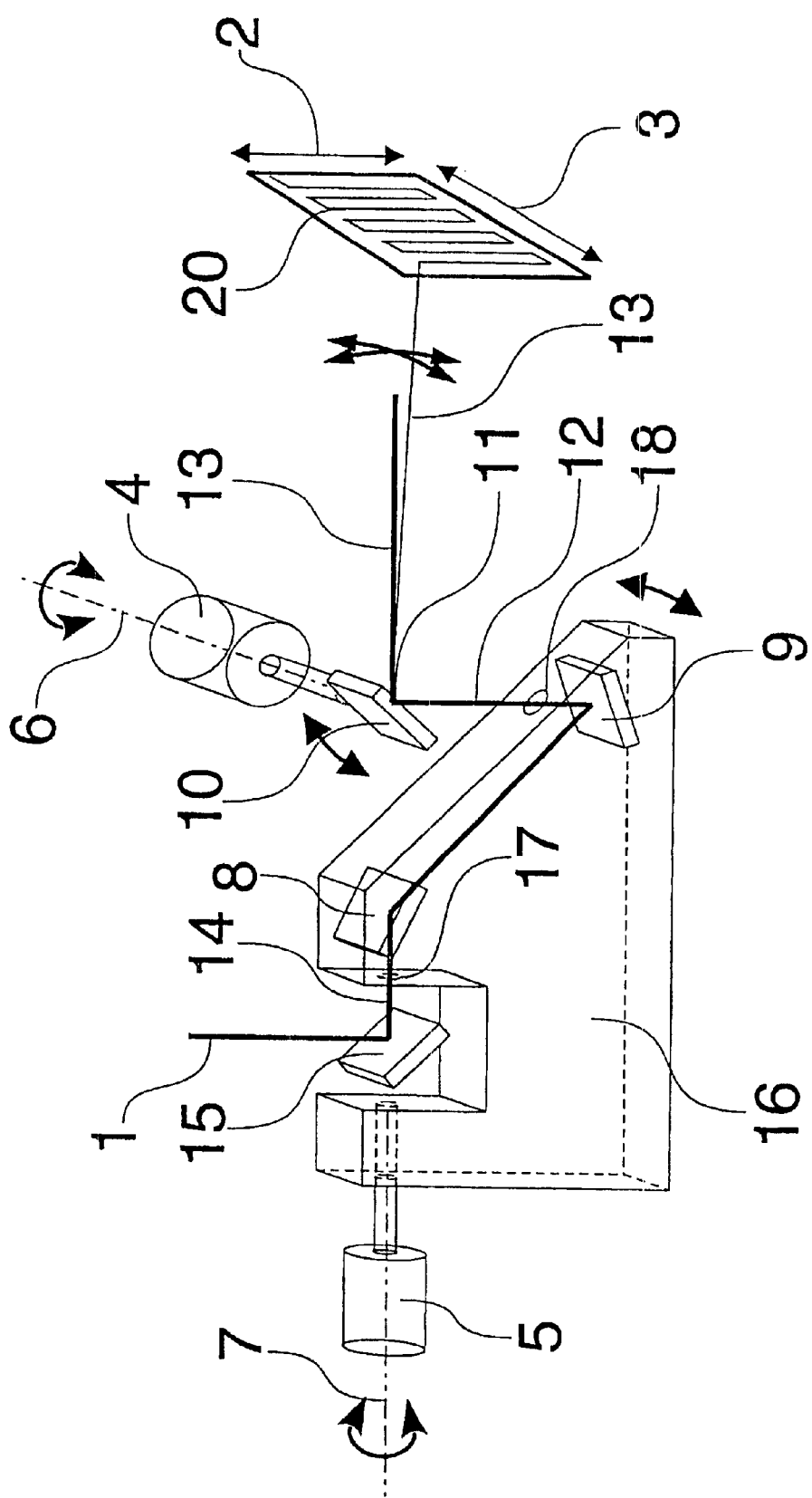
FIG. 1 shows a diagrammatic illustration of a first exemplary embodiment of an optical arrangement according to the invention for deflecting a light beam.

FIG. 1 shows an optical arrangement for deflecting a light beam 1 in two substantially mutually perpendicular directions 2, 3. The optical arrangement has a first and second mirror 8 and 10 which can be respectively rotated by a first and second rotary drive 4 and 5 about mutually perpendicular axes—the fist-axis of rotation 7 and the second axis of rotation 6—the first mirror 8 being assigned a third mirror 9 in a prescribed angular position in a rotationally fixed fashion such that the first and third mirror 8 and 9, that is to say first and third mirror 8 and 9, assigned to one another, rotate jointly about the fist-axis of rotation 7, and, in this case, rotate the light beam 1 about a pivot point 11 which lies on the second axis of rotation 6 of the second mirror 10.

According to the invention, the first, third and second mirror 8, 9 and 10 are arranged in such a way that the optical axis of the light beam 12 running between the third and the second mirrors 9 and 10 always lies substantially in a plane containing the second axis of rotation and being perpendicular to the first axis or rotation 7.

The first, third and second mirrors 8, 9 and 10 are arranged in such a way that the optical axis of the light beam 12 running from the third mirror 9 to the second mirror 10 always impinges substantially at a point 11 on the mirror surface of the second mirror 10 which is the point of intersection of the two axes of rotation 6, 7. Consequently, the deflected light beam 13 always pivots or rotates about the pivot 11.

Figure 2:
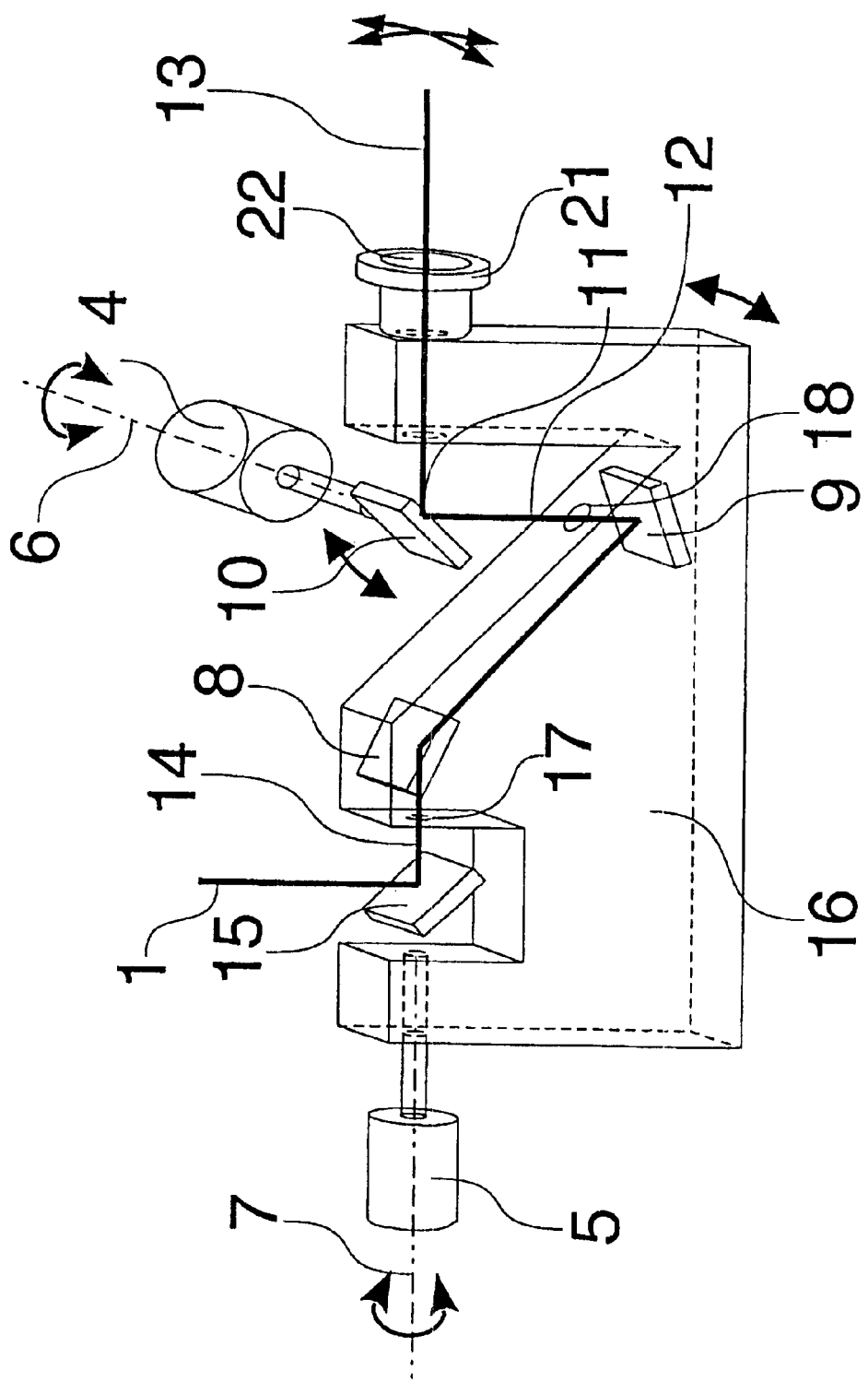
FIG. 2 shows a diagrammatic illustration of a second exemplary embodiment according to the invention.
Figure 3:
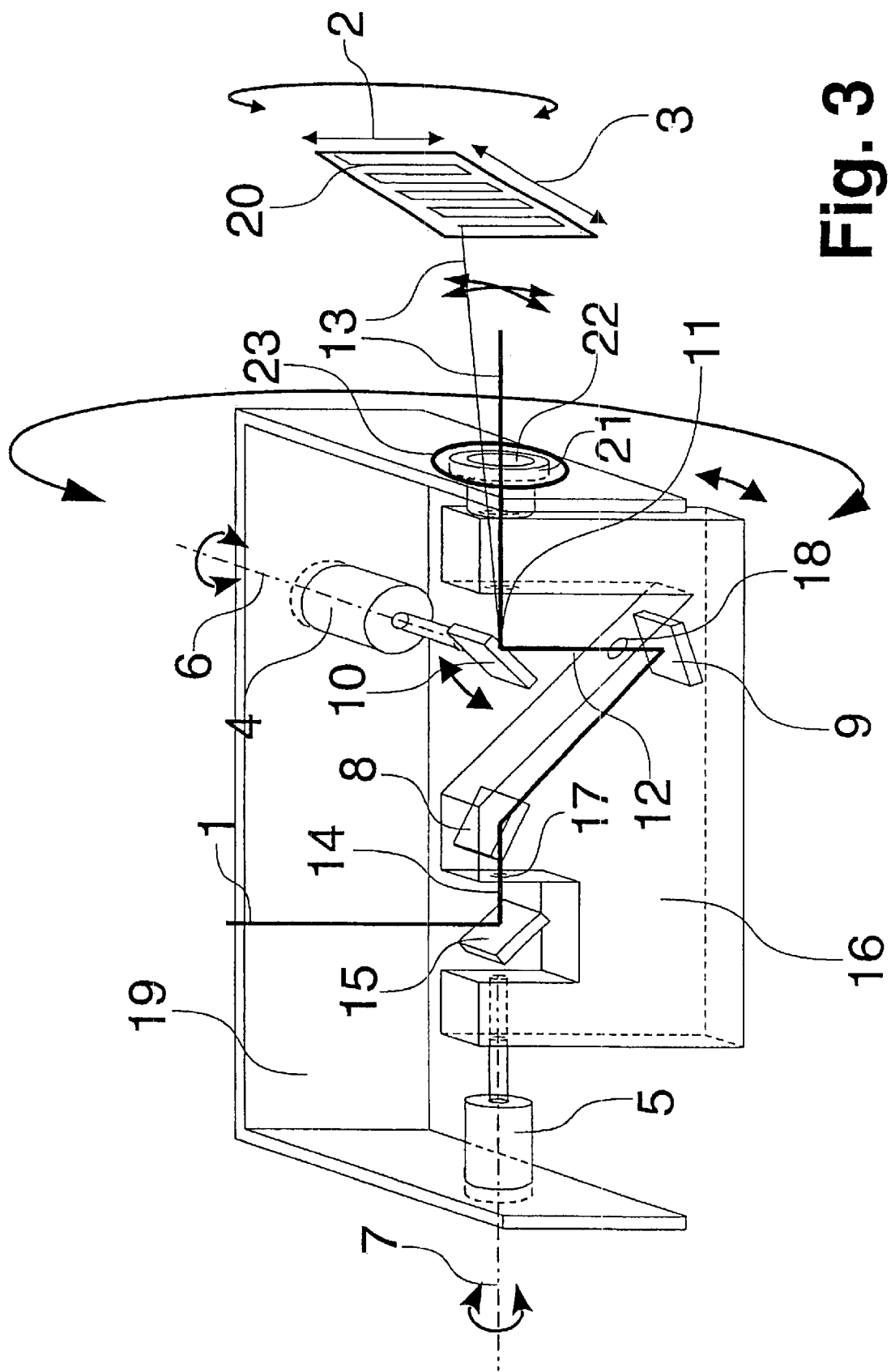
FIG. 3 shows a diagrammatic illustration of a third exemplary embodiment according to the invention.

The optical axis of the light beam 14 incident on the first mirror 8, and the optical axis of the light beam 13 reflected by the second mirror 10 are substantially collinear when the second mirror 10 is in the non-deflected position which is illustrated in FIGS. 1 to 3. The first axis of rotation 7 of is substantially collinear with the optical axis of the light beam 14 incident on the first mirror 8. Furthermore, the first axis of rotation 7 of the first and third mirror 8 and 9 is substantially collinear with the optical axis of the light beam 13 reflected by the second mirror 10 when the second mirror 10 is located in the non-deflected position.

A fourth mirror 15 is arranged fixed between the rotary drive 5, which rotates the first and third mirrors 8 and 9 about the first axis of rotation 7. The first and third mirrors 8 and 9 are arranged in a housing 16. The housing 16 has two openings 17, 18. The light beam 14 incident on the first mirror 8 can pass through the opening 17, and the light beam 12 reflected by the third mirror 9 can run through the opening 18 to the second mirror 10.

The housing 16 is connected directly to the rotary drive 5, specifically directly to the mechanical axis of rotation thereof. The second mirror 10 is connected directly to the second rotary drive 4, to the mechanical axis of rotation thereof.

The first and second rotary drives 5 and 4 are fitted directly on the holding device 19 shown in FIG. 3. The holding device 19 is arranged rotatably and rotates about the first axis of rotation 7. Owing to the rotation of the holding device 19 about the first axis of rotation 7, it is possible to vary the orientation of the beam-deflecting devices 2, 3, and thus of the deflection pattern 20. The fast beam deflection, realized in this exemplary embodiment, along the direction 2 by the solely rotating second mirror 10 can therefore be advantageously orientated arbitrarily.

The axis of rotation 7 of the first and third mirrors 8 and 9 is substantially collinear with the optical axis of the light beam 14 incident on the first mirror 8. Furthermore, the first axis of rotation 7 of the first and third mirrors 8 and 9 is substantially collinear with the optical axis of the light beam 13 reflected by the second mirror 10 when the second mirror 10 is located in the non-deflected position.

A fourth mirror 15 is arranged fixed between the first rotary drive 5, which rotates the first and third mirrors 8 and 9 about the first axis of rotation 7. The first and third mirrors 8 and 9 are arranged in a housing 16. The housing 16 has two openings 17, 18. The light beam 14 incident on the first mirror 8 can pass through the opening 17, and the light beam 12 reflected by the third mirror 9 can run through the opening 18 to the second mirror 10.

FIG. 2 shows an exemplary embodiment according to the invention in which the housing 16 accommodating the first and third mirrors 8 and 9 has a rotary bearing 21. The rotary bearing 21 has a passage 22 through which the deflected light beam 13 can pass. It can be seen from FIG. 2 that the rotary bearing 21 is mounted in the holding device 19. Consequently, the housing 16 is mounted, firstly, by the first rotary drive 5 and, secondly, by the rotary bearing 21 during the rotary movement about the first axis of rotation 7. The rotary bearing 21 of the housing 16 of the first and third mirrors 8 and 9 is mounted in a rotary bearing 23 of the holding device 19. The rotary bearing 23 is connected to a housing (not illustrated) which accommodates the arrangement according to the invention for deflecting a light beam.

It is to be seen in outline from FIG. 3 that the axis of the rotary bearing 21 of the housing 16 of the first and third mirrors 8 and 9 is arranged collinearly with the axis of the rotary bearing 23 of the holding device 19. These two axes coincide with the first axis of rotation 7.

The components of the optical arrangement for deflecting a light beam are designed in the form of modular components which are easy to replace. In this case, the housing 16 accommodating the first and third mirrors 8 and 9 and the first rotary drive 5 rotating the housing 16, as shown in FIGS. 1 and 2, form a replaceable module. The second mirror 10 and the second rotary drive 4 rotating it form a further replaceable module. The overall holding device 19 shown in FIG. 3 is likewise of modular design. The first rotary drive 5 rotating the housing 16 is designed as a galvanometer which can execute oscillations in a frequency range from 10 to 800 Hz. The second rotary drive 4 rotating the second mirror 10 is designed as a resonant galvanometer and oscillates at a frequency of 4 kHz. The holding device 19 is rotated about the first axis of rotation 7 by a stepping motor (not illustrated).

Finally, it may be pointed out quite specifically that the exemplary embodiments discussed above serve only to describe the claimed teaching, but do not limit the latter to the exemplary embodiments.

What is claimed is:

1. An optical arrangement for deflecting a light beam in two substantially mutually perpendicular directions comprising a first rotary drive defining a first axis of rotation, a second rotary drive defining a second axis of rotation, wherein the axes are mutually perpendicular, a first mirror rotated by the first rotary device, a second mirror rotated by the second rotary device, a third mirror arranged in an angular position with respect to the first mirror wherein the first and third mirror rotate jointly about the first axis, a pivot point is defined on the second mirror, wherein the light beam pivots about the pivot point which lies on the second axis of rotation of the second mirror, and the first, second and third mirrors are arranged, that a light beam running between the second and the third mirrors and the second axis of rotation are always substantially in one plane and the plane is perpendicular to the first axis of rotation.

2. Arrangement according to claim 1, wherein the light beam running from the second mirror to the third mirror always impinges substantially at the point on a surface of the second mirror and the pivot point lies on a intersection of the first and second axes of rotation.

3. Arrangement according to claim 1, wherein the first axis of rotation of the first and third mirror is substantially collinear with the light beam incident on the first mirror.

4. Arrangement according to claim 1, wherein a fourth mirror is arranged between the first rotary drive rotating and the first mirror.

5. Arrangement according to claim 4, characterized in that the fourth mirror is arranged fixed and a housing is provided for mounting the first and third mirror.

6. Arrangement according to claim 5, wherein the housing has at least two openings formed therein through which light beam enters and emerges.

7. Arrangement according to claim 5, characterized in that the housing is directly connected to the first axis of the first rotary drive.

8. Arrangement according to claim 5, wherein a rotary bearing is provided in the housing, which accommodates the first and third mirror and the rotary bearing is mounted in the holding device.

9. Arrangement according to claim 8, wherein the axis of the rotary bearing of the housing is arranged collinearly with the axis of the rotary bearing of the holding device.

10. Arrangement according to claim 5, wherein the housing accommodating the first and third mirror and the first rotary drive rotating the housing are combined to form a replaceable module and wherein the second mirror and the second rotary drive are combined to form a replaceable module.

11. Arrangement according to claim 1, wherein the second mirror is directly connected to the second rotary drive.

12. Arrangement according to claim 1, wherein the first and second rotary drives are mounted on a holding device and the holding device is arranged to rotate about the first axis of rotation.

13. Arrangement according to claim 1, wherein a galvanometer or a stepping motor serves as the first and second rotary drive.

14. A confocal scanning microscope comprises: an optical arrangement for deflecting a light beam in two substantially mutually perpendicular directions, the optical arrangement has a first rotary drive defining a first axis of rotation, a second rotary drive defining a second axis of rotation, wherein the axes are mutually perpendicular, a first mirror rotated by the first rotary device, a second mirror rotated by the second rotary device, a third mirror arranged in an angular position with respect to the first mirror wherein the first and third mirror rotate jointly about the first axis, a pivot point is defined on the second mirror, wherein the light beam pivots about the pivot point which lies on the second axis of rotation of the second mirror, and the first second and third mirrors are arranged, that a light beam running between the second and the third mirrors and the second axis of rotation are always substantially in one plane and the plane is perpendicular to the first axis of rotation.

15. The confocal scanning microscope as defined in claim 14, wherein the first axis of rotation of the first and third mirror is substantially collinear with the light beam incident on the first mirror.

16. The confocal scanning microscope as defined in claim 14, wherein a fourth mirror is arranged between the first rotary drive rotating and the first mirror.

17. The confocal scanning microscope as defined in claim 16, wherein a housing is provided for mounting the first, third and fourth mirror.

18. The confocal scanning microscope as defined in claim 1, wherein the housing has at least two openings formed therein through which light beam enters and emerges.

19. The confocal scanning microscope as defined in claim 17, wherein the housing is directly connected to the first axis of the first rotary drive.

20. The confocal scanning microscope as defined in claim 17, wherein a rotary bearing is provided in the housing, which accommodates the first and third mirror and the rotary bearing is mounted in the holding device.

21. The confocal scanning microscope as defined in claim 20, wherein the axis of the rotary bearing of the housing is arranged collinearly with the axis of the rotary bearing of the holding device.

22. The confocal scanning microscope as defined in claim 17, wherein the housing accommodating the first and third mirror and the first rotary drive rotating the housing are combined to form a replaceable module and wherein the second mirror and the second rotary drive are combined to form a replaceable module.

23. The confocal scanning microscope as defined in claim 17, wherein the replaceable modules have means for exact positioning, which are configured as guide elements and/or stop elements.

24. The confocal scanning microscope as defined in claim 14, wherein the second mirror is directly connected to the second rotary drive.

25. The confocal scanning microscope as defined in claim 14, wherein the first and second rotary drives are mounted on a holding device and the holding device is arranged to rotate about the first axis of rotation.

26. The confocal scanning microscope as defined in claim 14, wherein at least one of the mirrors is replaced by an optically active component, which consists essentially of an AOD (Acousto-Optical Deflector), an EOD (Electro-Optical Deflector) or aDMD (Digital Micro-Mirror Device).

27. The confocal scanning microscope as defined in claim 14, wherein at least one optically active component is upstream and/or downstream of the first, second and third mirror, and the optically active component consists essentially of an AOD (Acousto-Optical Deflector), an EOD (Electro-Optical Deflector) or aDMD (Digital Micro-Mirror Device).

28. A confocal scanning microscope comprises: an optical arrangement for deflecting a light beam in two substantially mutually perpendicular directions, the optical arrangement has a first rotary drive defining a first axis of rotation, a second rotary drive defining a second axis of rotation, wherein the axes are mutually perpendicular, a first mirror rotated by the first rotary device, a second mirror rotated by the second rotary device, a third mirror arranged in an angular position with respect to the first mirror wherein the first and third mirror rotate jointly about the first axis, a pivot point is defined on the second mirror, wherein the light beam pivots about the pivot point which lies on the second axis of rotation of the second mirror, and wherein the light beam running from the second mirror to the third mirror always impinges substantially at the point on a surface of the second mirror and the pivot point lies on an intersection of the first and second axes of rotation.

29. The confocal scanning microscope as defined in claim 28, wherein the first axis of rotation of the first and third mirror is substantially collinear with the light beam incident on the first mirror.

30. The confocal scanning microscope as defined in claim 28, wherein a fourth mirror is arranged between the first rotary drive rotating and the first mirror.

31. The confocal scanning microscope as defined in claim 30, wherein a housing is provided for mounting the first, third and fourth mirror.

32. The confocal scanning microscope as defined in claim 28, wherein the first and second rotary drives are mounted on a holding device and the holding device is arranged to rotate about the first axis of rotation.

33. The confocal scanning microscope as defined in claim 32, wherein the housing accommodating the first and third mirror and the first rotary drive rotating the housing are combined to form a replaceable module and wherein the second mirror and the second rotary drive are combined to form a replaceable module.

34. The confocal scanning microscope as defined in claim 33, wherein the replaceable modules have means for exact positioning, which are configured as guide elements and/or stop elements.

35. The confocal scanning microscope as defined in claim 28 wherein the first and second rotary drive are configured as a galvanometer.

36. The confocal scanning microscope as defined in claim 28 wherein the first and second rotary drive are configured as a stepping motor.

37. The confocal scanning microscope as defined in claim 28, wherein at least one of the mirrors is replaced by an optically active component, which consists essentially of an AOD (Acousto-Optical Deflector), an EOD (Electro-Optical Deflector) or aDMD (Digital Micro-Mirror Device).

38. The confocal scanning microscope as defined in claim 28, wherein at least one optically active component is upstream and/or downstream of the first, second and third mirror, and the optically active component consists essentially of an AOD (Acousto-Optical Deflector), an EOD (Electro-Optical Deflector) or aDMD (Digital Micro-Mirror Device).

* * * * *

UNITED STATES PATENT AND TRADEMARK OFFICE
CERTIFICATE OF CORRECTION

PATENT NO.    : 6,618,178 B2
DATED         : September 9, 2003
INVENTOR(S)   : Johann Engelhardt It is certified that error appears in the above-identified patent and that said Letters Patent is hereby corrected as shown below:

Column 9,
Lines 20-21, please replace "claim 1" with -- claim 17 --

Signed and Sealed this

Thirtieth Day of December, 2003

JAMES E. ROGAN
*Director of the United States Patent and Trademark Office*